(12) United States Patent
Hwang et al.

(10) Patent No.: US 7,756,687 B2
(45) Date of Patent: Jul. 13, 2010

(54) METHOD FOR PREDICTING CONTRIBUTIONS OF SILICON INTERSTITIALS TO N-TYPE DOPANT TRANSIENT ENHANCED DIFFUSION DURING A PN JUNCTION FORMATION

(76) Inventors: Gyeong S. Hwang, 9308 Evening Primrose Path, Austin, TX (US) 78750; Scott A. Harrison, 1561 Vista Club Cir., #210, Santa Clara, CA (US) 95054

(*) Notice: Subject to any disclaimer, the term of this patent is extended or adjusted under 35 U.S.C. 154(b) by 932 days.

(21) Appl. No.: 11/536,740

(22) Filed: Sep. 29, 2006

(65) Prior Publication Data
US 2007/0072317 A1  Mar. 29, 2007

Related U.S. Application Data

(60) Provisional application No. 60/722,313, filed on Sep. 29, 2005.

(51) Int. Cl.
*G06F 17/50* (2006.01)
*H01L 21/67* (2006.01)
(52) U.S. Cl. .................. 703/2; 703/6; 703/13; 438/45; 438/369
(58) Field of Classification Search .................. 703/2, 703/6, 13; 438/45, 369
See application file for complete search history.

(56) References Cited

U.S. PATENT DOCUMENTS 6,577,993 B1 * 6/2003 Sakamoto .................. 703/14
6,594,625 B2 * 7/2003 Hayashi ..................... 703/2
6,685,772 B2 * 2/2004 Goddard et al. ............ 117/3

OTHER PUBLICATIONS

Scott A. Harrison et al., "Mechanisms for Interstitial-Mediated Transient Enhanced Diffusion of N-Type Dopants", 2006, Materials Research Society, pp. 1-6.*
Scott A. Harrison et al., "Structure, stability, and diffusion of arsenic-silicon interstitial pairs", 2005, American Institute of Physics, pp. 1-3.*
Scott A. Harrison et al., "Origin of vacancy and interstitial stabilization at the amorphous-crystalline Si interface", 2004, American Institute of Phyisc, pp. 1-5.*
A. Nylandsted Larsen et al., "Heavy doping effects in the diffusion of group IV and V impurities in silicon," J. Appl. Phys. 73 (2), Jan. 15, 1993, pp. 691-698.
Ant Ural et al., "Fractional contributions of microscopic diffusion mechanisms for common dopants and self-diffusion in silicon," Journal of Applied Physics, vol. 85, No. 9, May 1, 1999, pp. 6440-6446.

(Continued)

*Primary Examiner*—Jason Proctor
(74) *Attorney, Agent, or Firm*—Schwabe, Williamson & Wyatt P.C.

(57) ABSTRACT

A method for predicting the contribution of silicon interstitials to n-type dopant transient enhanced diffusion during a pn junction formation is disclosed. Initially, fundamental data for a set of microscopic processes that can occur during one or more material processing operations are obtained. The fundamental data are then utilized to build kinetic models for a set of reactions that contribute substantially to an evolution of n-type dopant concentration and electrical activities. The kinetic models are subsequently applied to a simulator to predict temporal and spatial evolutions of concentration and electrical activity profiles of the n-type dopants.

15 Claims, 6 Drawing Sheets

OTHER PUBLICATIONS

D. Mathiot et al., "Diffusion of arsenic in silicon: Validity of the percolation model," Appl. Phys. Lett. 42 (12), Jul. 15, 1983, pp. 1043-1044.

D. Segev et al., "Design of Shallow Donor Levels in Diamond by Isovalent-Donor Coupling," Physical Review Letters, vol. 91, No. 12, Sep. 19, 2003, pp. 1-4.

David Vanderbilt, "Soft self-consistent pseudopotentials in a generalized eigenvalue formalism," Rapid Communications, Physical Review B, vol. 41, No. 10, Apr. 15, 1990, pp. 7892-7895.

Graeme Henkelman et al., "A climbing image nudged elastic band method for finding saddle points and minimum energy paths," Journal of Chemical Physics, vol. 113, No. 22, Dec. 8, 2000, pp. 9901-9904.

G. Kresse et al., "Ab initio molecular dynamics for liquid metals," Rapid Communications, Physical Review B, vol. 47, No. 1, Jan. 1, 1993, pp. 558-561.

G. Kresse et al., "Efficient iterative schemes for ab initio total-energy calculations using a plane-wave basis set," Physical Review B, vol. 54, No. 16, Oct. 15, 1996, pp. 169-186.

G. Makov et al., "Periodic boundary conditions in ab initio calculations," Physical Review B, vol. 51, No. 7, Feb. 15, 1995, pp. 4014-4022.

Hendrik J. Monkhorst et al., "Special points for Brillouin-zone integrations," Physical Review B, vol. 13, No. 12, Jun. 15, 1976, pp. 5188-5192.

John P. Perdew et al., "Accurate and simple analytic representation of the electron-gas correlation energy," Physical Review B, vol. 45, No. 23, Jun. 15, 1992, pp. 244-249.

Jianjun Xie et al., "Diffusion and Clustering in Heavily Arsenic-Doped Silicon: Discrepencies and Explanation," Physical Review Letters, vol. 83, No. 9, Aug. 30, 1999, pp. 1795-1798.

Madhavan Ramamoorthy et al., "Complex Dynamical Phenomena in Heavily Arsenic Doped Silicon," Physical Review Letters, vol. 76, No. 25, Jun. 17, 1996, pp. 4753-4756.

Ryangsu Kim et al., "Influences of Point and Extended Defects on As Diffusion in Si," Jpn. J. Appl. Phys., vol. 41, Jan. 2002, pp. 227-231.

Scott A. Harrison et al., "Interaction between interstitials and aresenic-vacancy complexes in crystalline silicon," Applied Physics Letters, vol. 85, No. 21, Nov. 22, 2004, pp. 4935-4937.

S. Solmi et al., "Transient enhanced diffusion of arsenic in silicon," Journal of Applied Physics, vol. 94, No. 8, Oct. 15, 2003, pp. 4950-4955.

S. Solmi et al., "High concentration diffusivity and clustering of arsenic and phosphorus in silicon," Journal of Applied Physics, vol. 83, No. 5, Mar. 1, 1998, pp. 2484-2490.

Taras A. Kirichenko et al., "Interaction of neutral vacancies and interstitials with the Si(001) surface," Physical Review B, vol. 70, Jul. 30, 2004, pp. 1-7.

* cited by examiner

METHOD FOR PREDICTING CONTRIBUTIONS OF SILICON INTERSTITIALS TO N-TYPE DOPANT TRANSIENT ENHANCED DIFFUSION DURING A PN JUNCTION FORMATION

RELATED APPLICATION

This application claims priority under 35 U.S.C. §119(e)(1) to provisional application No. 60/722,313 filed on Sep. 29, 2005, the contents of which are incorporated herein by reference.

BACKGROUND OF THE INVENTION

1. Technical Field

The present invention relates to semiconductor modeling in general, and in particular to a method for predicting properties resulting from processes used in the preparation of semiconductor materials. Still more particularly, the present invention relates to a method for predicting the contribution of silicon interstitials to n-type dopant transient enhanced diffusion during a pn junction formation.

2. Description of Related Art

With the current technology, pn junctions are typically fabricated within a silicon substrate by using a low-energy ion implantation followed by a high-temperature thermal annealing. The ion implantation introduces dopant impurities into the silicon substrate, and the thermal annealing repairs any ion-bombardment induced substrate damage while electrically activates the implanted dopant impurities. During the thermal annealing, the dopant impurities often exhibit significant transient enhanced diffusion (TED). TED can lead to severe dopant profile broadening, which poses a great hurdle to fabrications of ultra-shallow pn junctions (i.e., less than 20 nm in depth).

As the size of semiconductor devices continues to decrease, ultra-shallow pn junctions are required to avoid short-channel effects. Thus, a deeper understanding of the underlying mechanisms of dopant TED is needed in order to find the optimum processing conditions for the successful fabrication of ultra-shallow pn junctions. With such understanding, it would be desirable to provide a method for minimizing dopant TED while maximizing the electrical activity of injected dopant impurities.

SUMMARY OF THE INVENTION

In accordance with a preferred embodiment of the present invention, fundamental data for a set of microscopic processes that can occur during one or more material processing operations are initially obtained. The fundamental data are then utilized to build kinetic models for a set of reactions that contribute substantially to an evolution of n-type dopant concentration and electrical activities. The kinetic models are subsequently applied to a simulator to predict temporal and spatial evolutions of concentration and electrical activity profiles of the n-type dopants.

All features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Arsenic (As) is the most common n-type dopant used in the fabrication of silicon (Si)-based electronic devices by virtue of its high solubility, high activation, and low diffusivity. It has been determined that silicon interstitials ($Si_i$) contribute to As transient enhanced diffusion (TED) during pn junction formations. For the negatively charged As—$Si_i$ pair, it was found that a minimum energy structure in which the As atom bridges two lattice Si atoms, while for the neutral and positively charged As—$Si_i$, the lowest energy structure includes an As—$Si_i$ pair that is aligned in the direction while sharing a lattice site. Such results suggest that, in n-type extrinsic regions, the diffusion of −1 charged As—$Si_i$ pairs will be prevailing with an overall activation energy of 3.0-3.3 eV, while under intrinsic conditions, the neutral and −1 charged pairs will both contribute to As diffusion.

Figure 1:
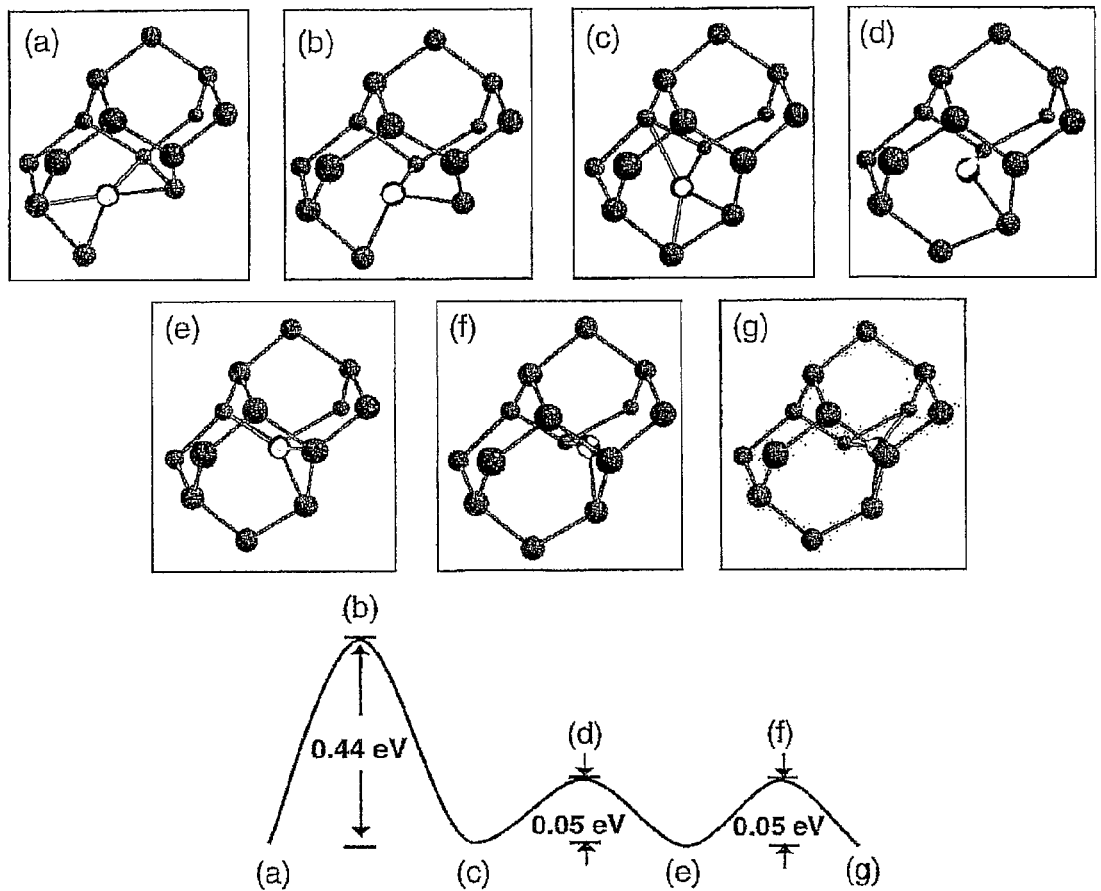
FIG. 1 illustrates an As—$Si_i^-$ pathway.

Referring now to the drawings and in particular to FIG. 1, there is illustrated a diffusion pathway for the negatively charged As—$Si_i^-$, pair. In FIG. 1, dark-color balls represent As atoms and light-color balls represent Si atoms. The diffusion pathway includes three steps. In the first step, an As—Si bond breaks and a new As—Si bond forms as the As atom migrates over a barrier of 0.44 eV from one bridged As site to another. The next two steps involve As reorientation within the same bridged site by overcoming barriers of 0.05 eV. The low barrier for As reorientation ensures that As—$Si_i^-$ diffusion will occur in a random direction.

Figure 2:
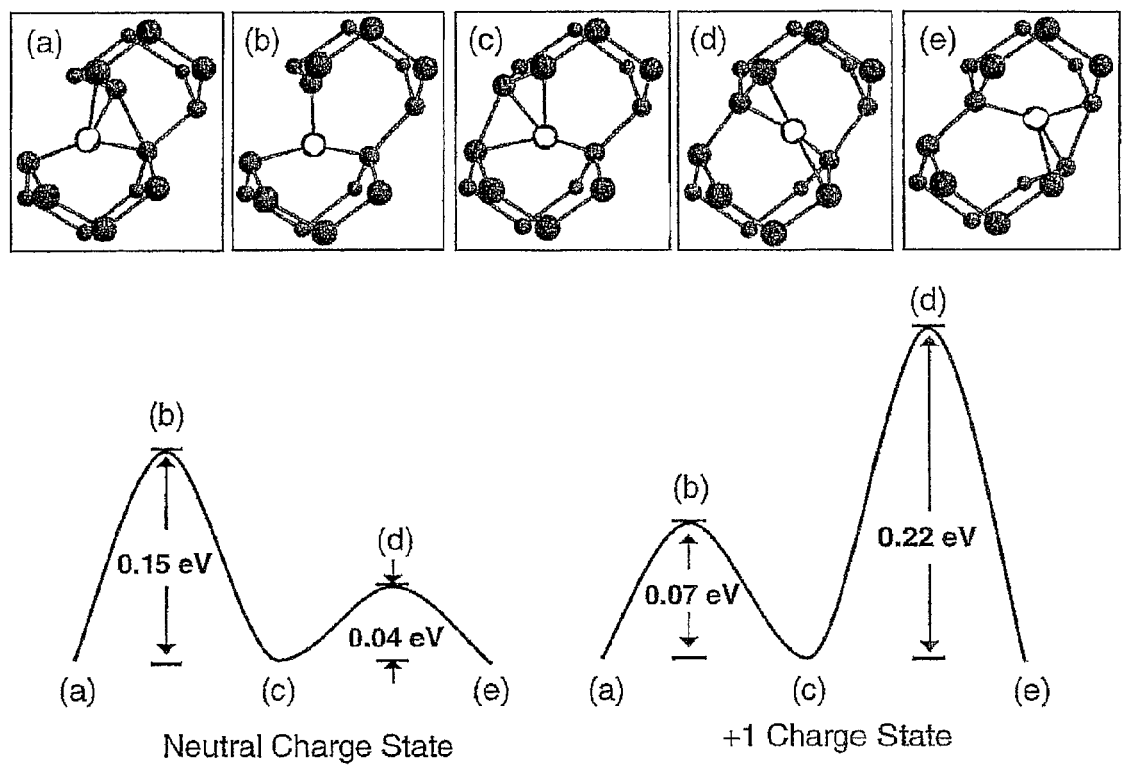
FIG. 2 illustrates an As—$Si_i^-$ pathway for a first diffusion mechanism.
Figure 3:
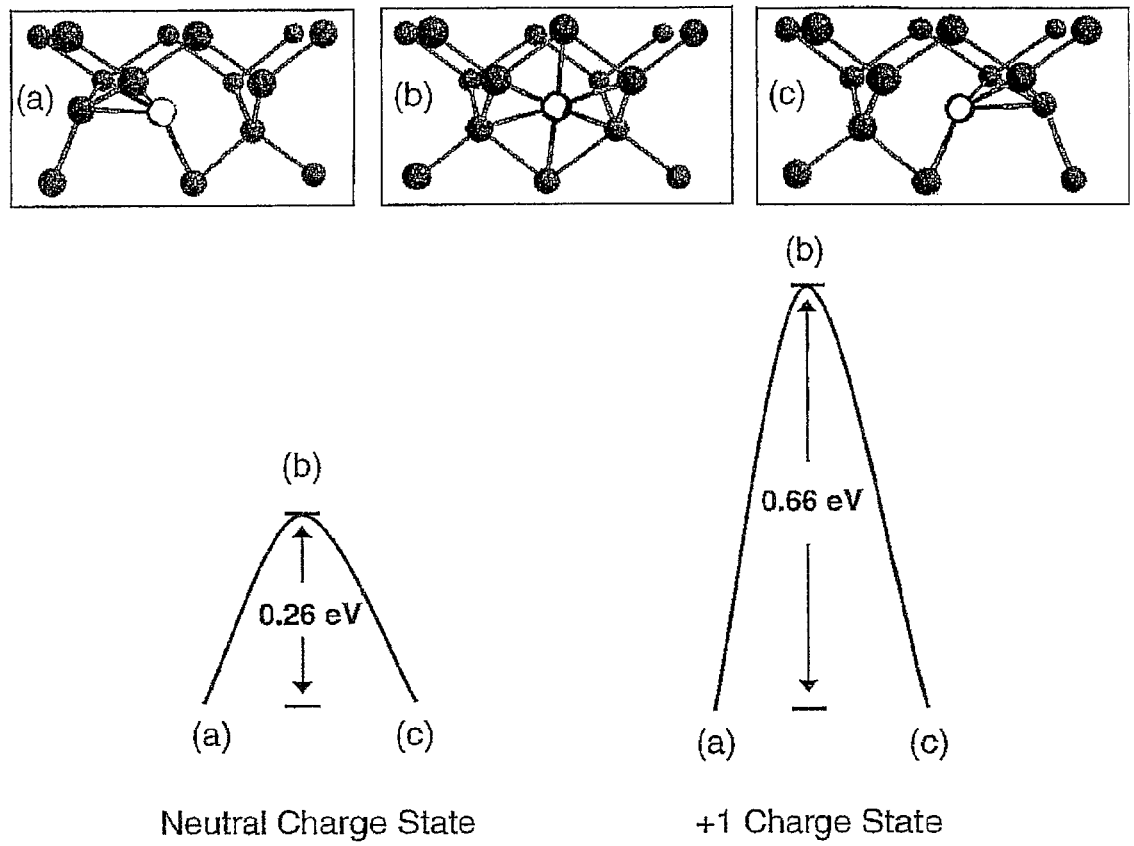
FIG. 3 illustrates an As—$Si_i^-$ pathway for a second diffusion mechanism.

Two diffusion mechanisms, namely, mechanisms A and B, for the neutral As—$Si_i^0$ and positively charged As—$Si_i^+$ pairs are identified. The atomic structures at the local minima and saddle points for mechanisms A and B, along with corresponding energy diagrams, are illustrated in FIGS. 2 and 3. In FIGS. 2 and 3, dark-color balls represent As atoms and light-color balls represent Si atoms. Mechanism A involves two transition states $TS_{A1}$ and $TS_{A2}$, depicted in (b) and (d) of FIG. 2, respectively, which mechanism B involves one transition state $TS_B$ depicted in (b) of FIG. 3.

In mechanism A, the two steps involved in As—$Si_i$ pair diffusion include: (i) the As and $Si_i$ atoms switching their positions at the same lattice site through the transition state $T_{A1}$, and (ii) the As atom moving to an adjacent lattice site through the transition state $T_{A2}$ while pushing a neighboring Si lattice atom in the [110] direction to form a As—$Si_i$, pair at the adjacent lattice site. As shown in FIG. 2, the energy barriers for the two steps are predicted to be 0.15 eV (0.07 eV) and 0.04 eV (0.22 eV) for the neutral (positively charged) As—$Si_i$ pair, respectively. Note that the second step becomes the limiting step in the positive charge state in contrast to the neutral charge state where the first step was the limiting step.

Mechanism B predicts As—$Si_i$ pair diffusion via a hexagonal interstitial site. In this case, the As atom migrates from a

[110]-split state to another [110]-split state via the hexagonal As interstitial state (which turns out to be the transition state, $TS_B$). As shown in FIG. 3, this diffusion jump requires overcoming a barrier of 0.26 eV in the neutral state, while 0.66 eV in the positive charge state. It is worthwhile to note the diffusion directions associated with mechanisms A and B. In mechanism A (FIG. 2), the As diffusion is restricted to the [110] direction, while it can occur in a random direction through mechanism B (FIG. 3). However, considering the small barrier difference (of approximately 0.1 eV) between mechanisms A and B, it can be expected that the neutral As—$Si_i$ pair may undergo diffusion by both pathways.

The computed formation energies and diffusion barriers yield the overall activation energies of (2.89+0.42=) 3.40 eV, (3.11+0.15=) 3.26 eV, and (3.33+0.22=) 3.55 eV for As—$Si_i$ pair diffusion in the negative, neutral, and positive charge states, respectively, under intrinsic conditions (where the Fermi level is positioned at mid gap). The comparable diffusion activation energies of the negatively charged and neutral complexes indicate that both may contribute to interstitial-mediated As diffusion under intrinsic conditions. Under highly n-type doped regions, the formation energy of the anionic As—$Si_i^-$ pair will decrease, making it the dominate diffusing species. At midgap and above, the As—$Si_i^-$ pair will have an approximate activation energy of 3.1-3.4 eV based on the computed band gap.

Basically, plane-wave basis, pseudopotential total energy calculations are utilized to determine the structure, stability, and diffusion of As—$Si_i$ pairs. Under intrinsic conditions, the binding energies of As—$Si_i^-$, As—$Si_i^0$, and As—$Si_i^+$, are estimated to be 0.72 eV, 0.59 eV, and 0.37 eV, respectively, relative to the dissociation products of substitutional $As^0$ and [110]-split $Si_i^0$. As—$Si_i^-$ and As—$Si_i^0$ both contribute to As diffusion under intrinsic conditions with As—$Si_i^-$ diffusion dominating under extrinsic conditions. The overall diffusion activation energies of As—$Si_i^-$ and As—$Si_i^0$ pair are determined to be approximately 3.3-3.4 eV at midgap, which is consistent with 2.7-3.9 eV as determined by experiments. Furthermore, since As—V complexes can be easily annihilated by interstitial vacancy recombination, interstitials are expected to play an important role in As TED when Si interstitials exist in excess.

Figure 4:
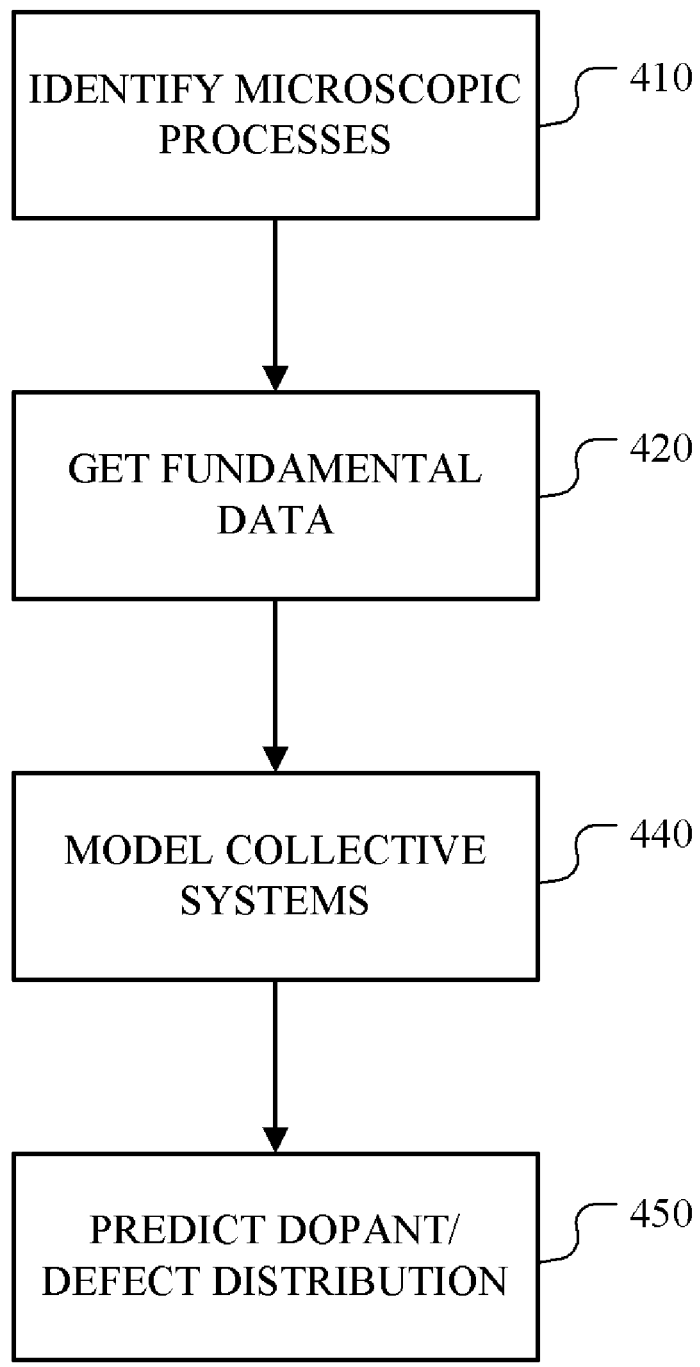
FIG. 4 is a high-level logic flow diagram of a method for modeling semiconductor processing.

With reference now to FIG. 4, there is depicted a high-level logic flow diagram of a method for modeling semiconductor processing, in accordance with a preferred embodiment of the present invention. Initially, one or more microscopic processes that may occur during a processing operation are identified, as shown in block 410. Processing operations may include any conventional techniques used in the processing of semiconductor materials, such as the implantation of As into a Si lattice. The microscopic processes can include any processes that may occur during the operation, including the association of dopants, substrate atoms, and/or impurities to form clusters or complexes, the diffusion of such complexes and dopant components, the dissociation of complexes, and the like. Next, fundamental data are obtained for the microscopic processes of interest, as depicted in block 420. Quantum mechanics (QM) calculations can be used in this step to predict the energetics and structures for the various states, the barriers for the various processes in which atoms and defects move from site to site, and the other data required to predict the rates of various processes such as diffusion, association and dissociation. This can be done by calculating the relative energy of the various stable structures and the activation energies and entropies for the various dynamic and kinetic processes that connect the various sites.

Fundamental rate parameter data, which are obtained from QM calculations or from molecular dynamics (MD) calculations, are used to model the characteristics of collective systems incorporating distributions of several or many kinds of defects and impurities using molecular dynamics, as shown in block 430. For example, the calculations can be performed using kinetic Monte Carlo (kMC) dynamics. The kMC simulation provides information about the long-term consequences of defect/dopant reactions, indicating which clusters constitute major components and identifying the important reaction pathways.

The fundamental data (e.g., data from the QM calculations from block 420) and reaction information (e.g., information from the kMC dynamics calculations from block 430) are used to predict the distributions of dopant and defect components and clusters, as depicted in block 440. Equilibrium and non-equilibrium distributions of these components are predicted as a function of initial concentrations, temperature, and other external conditions (e.g., stress, voltage, magnetic fields, electromagnetic fields, temperature profiles, external radiation). In addition to the above-mentioned atomistic approaches, the predicted distributions are solved as a function of time and processing conditions with a hierarchy of methods that may involve partial differential equations using finite elements and continuum approaches along with atomistic conditions.

Processing operations can involve many components, including dopants, defects and clusters or complexes as discussed above, the concentrations of which at a given time can be interdependent. For example, ion implantation of As in a silicon lattice creates many species, including substitutional and interstitial As atoms, interstitial Si atoms, vacancies, and clusters of various numbers of As and Si atoms. Some of these species, referred to here as fast species or components, can have very high diffusivity or dissociation rates (which can be estimated according to the diffusion energy barrier and binding energy, respectively), such that the local concentration of these species will vary significantly with time as they either diffuse away or dissociate into other components.

As the system evolves in time, some fast processes may achieve a steady state in which the relative concentrations are nearly constant with only the overall population changing slowly with time. In such circumstances, the atomistic dynamics may be replaced with a constitutive equation whose parameters are determined from the atomistic equations. This can allow the longer time phenomena to be described in terms of a mesoscopic or continuum equation, greatly extending the time and length scales that are practical.

The method for predicting defect-mediated temporal concentration profiles of n-type dopants in a Si substrate during high-temperature thermal treatments begins with obtaining fundamental data for a set of microscopic processes that can occur during one or more material processing operations. The fundamental data include data representing the kinetics of processes in said set of microscopic processes and the atomic structure and energetics of possible states in material processing operations.

Then, the fundamental data are utilized to build kinetic models for a set of reactions that contribute substantially to an evolution of n-type dopant concentration and electrical activities.

The kinetic models are built by various calculations. For example, the kinetic models can be built via an estimation of a combination of silicon interstitials and substitutional arsenic atoms to form arsenic-interstitial pairs by determining an energy barrier and energy gain. The energy gain from the formation of arsenic-interstitials pairs is approximately 0.15~

$(0.66+E_g-E_D)$ eV, where $E_g$ and $E_D$ are the actual Si band gap and the first As-I donor level, respectively, in substrate materials.

The kinetic models can be built via an estimation of diffusion rates of mobile arsenic-interstitial and arsenic-vacancy complexes by determining diffusion pre-factors and activation energies. The mobile arsenic-interstitial and the arsenic-vacancy complexes include arsenic-interstitial (As-I) pair, diarsenic (substitutional-interstitial arsenic) pair, arsenic-vacancy (As-V) pair, and two arsenic substitutional-vacancy complex ($As_2V$).

The kinetic models can be built via an estimation of the combination of mobile silicon interstitials, arsenic-interstitial pairs, and immobile arsenic-interstitial clusters to form larger arsenic-interstitial clusters by calculating thermodynamics of arsenic-interstitial combination reactions. The thermodynamics of arsenic-interstitial combination reactions can be represented by

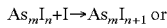
$$As_mI_n+I \rightarrow As_mI_{n+1} \text{ or}$$

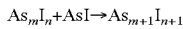
$$As_mI_n+AsI \rightarrow As_{m+1}I_{n+1}$$

where m and n are the number of substitutional arsenic atoms and silicon interstitials, respectively.

The kinetic models can be built via an estimation of the release of silicon interstitials and lattice atoms from arsenic-interstitial clusters by calculating the binding energies of departing interstitials to the remaining arsenic-interstitial clusters.

The kinetic models can be built via an estimation of vacancy annihilation of arsenic-vacancy complexes and vacancy clusters through interstitial-vacancy recombination by determining the thermodynamics of interstitial-vacancy recombination reactions:

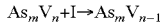
$$As_mV_n+I \rightarrow As_mV_{n-1}$$

where m and n are the number of substitutional arsenic atoms and vacancies, respectively.

The energy gains and barriers for the interstitial-vacancy recombination reactions are summarized in Table I.

TABLE I

| Reaction | $\Delta E$ | $E_m$ |
|---|---|---|
| $V + I \rightarrow \emptyset$ | 7.22 | 0.29 [1] |
| $AsV + I \rightarrow As$ | 5.89 | NB [1, 2; 1, 3] |
| $As_2V + I \rightarrow As_2$ | 4.34 | NB [1, 2, 3] |
| $As_3V + I \rightarrow As_3$ | 3.03 | 0.08 [1, 2, 3, 4] |
| $As_4V + I \rightarrow As_4$ | 1.34 | 0.06 |
| $V_2 + I \rightarrow V$ | 5.30 | 0.14 |
| $As_2V_2 + I \rightarrow As_2V$ | 5.28 | 0.21 [1, 4; 1, 5] |
| $As_3V_2 + I \rightarrow As_3V$ | 5.17 | 0.16 [1, 4, 5] | where $\Delta E$ and $E_m$ are the energy gain and the barrier, respectively.

The diffusion barriers for neutral arsenic-interstitial pairs and substitutional-interstitial arsenic pairs are about 0.2 eV and 1.33 eV, respectively, under intrinsic conditions.

Figure 5:
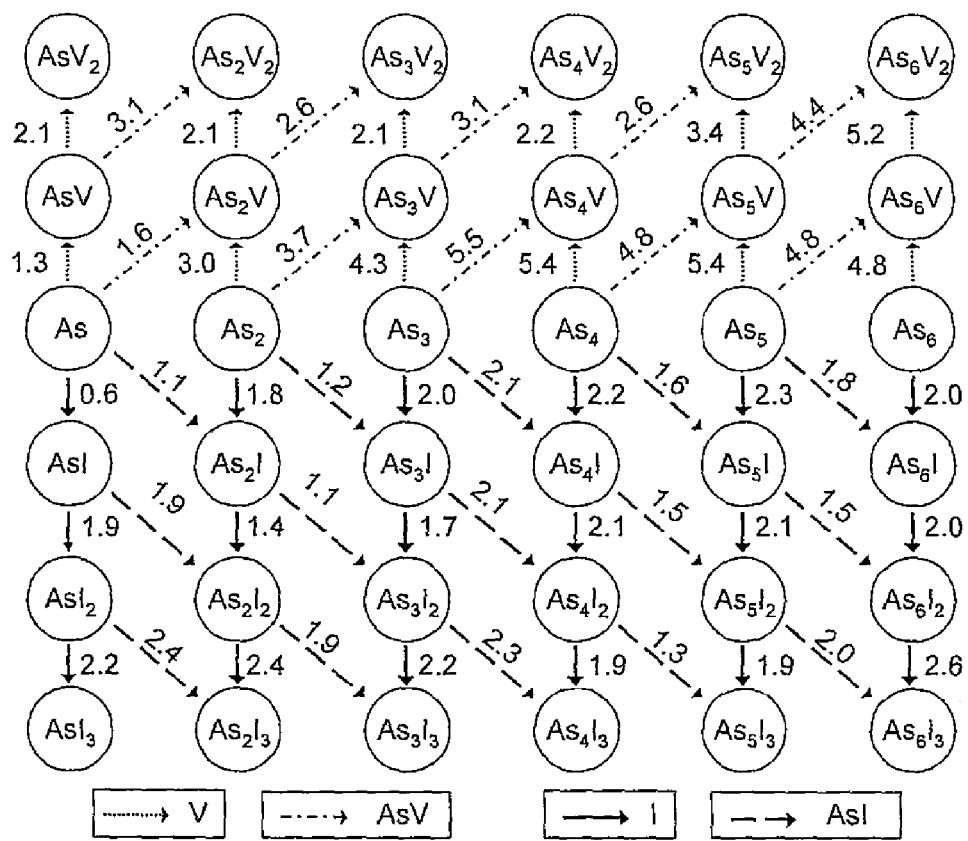
FIG. 5 illustrates the binding energies of neutral arsenic-interstitial and arsenic-vacancy clusters.

The binding energies of neutral arsenic-interstitial and arsenic-vacancy clusters are shown in FIG. 5. The major mobile complexes V, AsV, I, and AsI are represented by the different types of arrows (as shown above) with respective energy gains for the binding of each mobile species noted above each arrow.

As has been described, the present invention provides a method for predicting the contribution of Si interstitials to As dopant TED during a pn junction formation.

Figure 6:
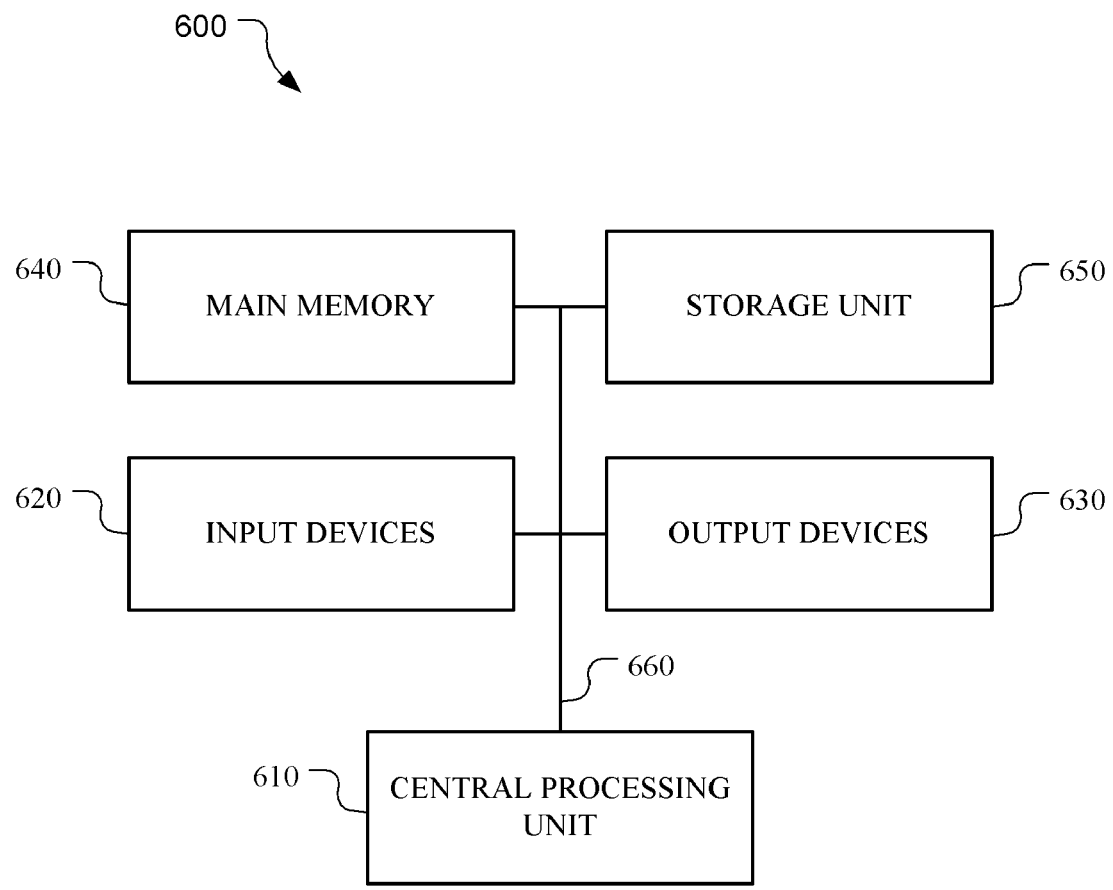
FIG. 6 is a block diagram of a computer system suitable for carrying out various functions of the present invention.

The method of the present invention may be implemented in a computer program product tangibly embodied in a computer-usable medium. With reference now to FIG. 6, there is illustrated a block diagram of a computer system suitable for carrying out various functions of the present invention. As shown, a computer system 600 includes a central processing unit 610, input devices 620, output devices 630, a main memory 640, and a storage unit 650, all connected to a system bus 660. Input devices 630 can be a keyboard and a mouse; and output devices 530 can be a monitor and a printer. Main memory 640 can be a dynamic random access memory; and storage unit 650 can be a hard disk.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for predicting a dopant concentration profile of a silicon substrate during one or more material processing operations on the silicon substrate, the method comprising:
   receiving, by a computing device, fundamental data representative of atomic processes that can occur in the silicon substrate during the one or more material processing operations;
   generating from the fundamental data, by the computing device, a kinetic model representative of reactions that contribute to an evolution of dopant concentration for the silicon substrate, said generating including estimating a rate of vacancy annihilation of arsenic-vacancy complexes and vacancy clusters through interstitial-vacancy recombination in the silicon substrate; and
   generating from the kinetic model, by the computing device, data representative of a profile for the evolution of the dopant concentration in the silicon substrate.

2. The method of claim 1, wherein said generating a kinetic model includes estimating a rate of formation of arsenic-interstitial pairs by a combination of silicon interstitials and substitutional arsenic atoms.

3. The method of claim 2, wherein the rate of formation is estimated by determining at least one of an energy barrier or an energy gain of the formation.

4. The method of claim 1, wherein said generating a kinetic model includes estimating a rate of formation of arsenic-interstitial clusters by a combination of mobile silicon interstitials, arsenic-interstitial pairs, and immobile arsenic-interstitial clusters by calculating thermodynamics of arsenic-interstitial combination reactions by

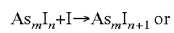
$$As_mI_n+I \rightarrow As_mI_{n+1} \text{ or}$$

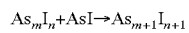
$$As_mI_n+AsI \rightarrow As_{m+1}I_{n+1}$$

where As represents arsenic, I represents a silicon interstitial, m is a number of substitutional arsenic atoms, and n is a number of silicon interstitials.

5. The method of claim 1, wherein said estimating a rate of vacancy annihilation of arsenic-vacancy complexes and vacancy clusters through interstitial-vacancy recombination includes determining thermodynamics of interstitial-vacancy recombination reactions by:

$$As_mV_{n+I} \rightarrow As_mV_{n-1}$$

where As represents arsenic, I represents a silicon interstitial, m is a number of substitutional arsenic atoms, and n is a number of vacancies.

6. The method of claim 1, further comprising displaying, on a monitor, the data representative of a profile for the evolution of the dopant concentration in the silicon substrate.

7. A tangible computer-readable medium having instructions stored thereon to enable a computing device to perform a method to predict a dopant concentration profile of dopants in a silicon substrate during one or more material processing operation on the silicon substrate, the method comprising:
receiving fundamental data representative of atomic processes that can occur in the silicon substrate during the one or more material processing operations;
generating from the fundamental data, a kinetic model representative of reactions that contribute to an evolution of dopant concentration of the silicon substrate, said generating including estimating a rate of vacancy annihilation of arsenic-vacancy complexes and vacancy clusters through interstitial-vacancy recombination in the silicon substrate; and
generating from the kinetic model, data representative of a profile of the evolution of the dopant concentration in the silicon substrate.

8. The computer-readable medium of claim 7, wherein said generating a kinetic model comprises estimating a rate of formation of arsenic-interstitial pairs by a combination of silicon interstitials and substitutional arsenic by determining at least one of an energy barrier or an energy gain of the formation.

9. The computer-readable medium of claim 8, wherein the energy gain from the formation of arsenic-interstitials pairs has a value between 0.15 and $(0.66+E_g-E_D)$ eV, where $E_g$ is a band gap value of silicon, and $E_D$ is an arsenic-interstitial donor level of silicon.

10. The computer-readable medium of claim 7, wherein said generating a kinetic model comprises estimating a rate of formation of arsenic-interstitial clusters by a combination of mobile silicon interstitials, arsenic-interstitial pairs, and immobile arsenic-interstitial clusters by calculating thermodynamics of arsenic-interstitial combination reactions by $$As_mI_n + I \rightarrow As_mI_{n+1} \text{ or}$$

$$As_mI_n + AsI \rightarrow As_{m+1}I_{n+1}$$

where As represents arsenic, I represents a silicon interstitial, m is a number of substitutional arsenic atoms, and n is a number of silicon interstitials.

11. The computer-readable medium of claim 7, wherein said estimating a rate of vacancy annihilation of arsenic-vacancy complexes and vacancy clusters through interstitial-vacancy recombination comprises determining thermodynamics of interstitial-vacancy recombination reactions:

$$As_mV_n + I \rightarrow As_mV_{n-1}$$

where As represents arsenic, I represents a silicon interstitial, m is a number of substitutional arsenic atoms, and n is a number of vacancies.

12. A system for predicting a dopant concentration profile of a silicon substrate during one or more material processing operations on the silicon substrate, the system comprising:
a processor; and
a computer-readable medium coupled to the one or more processors and having stored thereon, computer-executable instructions that, if executed by the one or more processors, cause the one or more processors to perform a method comprising:
receiving fundamental data representative of atomic processes that can occur in the silicon substrate during the one or more material processing operations;
generating, from the fundamental data, a kinetic model representative of reactions that contribute to an evolution of dopant concentration for the silicon substrate, said generating including estimating a rate of vacancy annihilation of arsenic-vacancy complexes and vacancy clusters through interstitial-vacancy recombination in the silicon substrate; and
generating, from the kinetic model, data representative of a profile for the evolution of the dopant concentration in the silicon substrate.

13. The system of claim 12, wherein said generating a kinetic model includes estimating a rate of formation of arsenic-interstitial pairs by a combination of silicon interstitials and substitutional arsenic atoms.

14. The system of claim 12, wherein said generating a kinetic model includes estimating a rate of formation of arsenic-interstitial clusters by a combination of mobile silicon interstitials, arsenic-interstitial pairs, and immobile arsenic-interstitial clusters.

15. The system of claim 12, wherein said generating a kinetic model includes estimating a rate of vacancy annihilation of arsenic-vacancy complexes and vacancy clusters through interstitial-vacancy recombination.

* * * * *